(12) United States Patent
Libicki et al.

(10) Patent No.: US 8,723,870 B1
(45) Date of Patent: May 13, 2014

(54) SELECTION OF OBJECT TYPES WITH DATA TRANSFERABILITY

(75) Inventors: Daniel Libicki, Jerusalem (IL); Hillel Maoz, Petah Tikva (IL)

(73) Assignee: Google Inc., Mountain View, CA (US)

( * ) Notice: Subject to any disclaimer, the term of this patent is extended or adjusted under 35 U.S.C. 154(b) by 182 days.

(21) Appl. No.: 13/361,448

(22) Filed: Jan. 30, 2012

(51) Int. Cl.
| | |
|---|---|
| *G06T 11/20* | (2006.01) |
| *G06T 1/60* | (2006.01) |
| *G09G 5/00* | (2006.01) |
| *G06K 9/60* | (2006.01) |
| *G06F 9/26* | (2006.01) |
| *G06F 17/00* | (2006.01) |
| *G06F 3/048* | (2013.01) |

(52) U.S. Cl.
USPC ........... 345/440; 345/581; 345/619; 345/530; 382/305; 707/705; 707/758; 709/203; 711/221; 715/215; 715/227; 715/273; 715/764; 715/769

(58) Field of Classification Search
USPC .............. 345/418, 581, 589, 619, 440, 440.2, 345/501, 530, 545, 548, 553; 382/254, 274, 382/284, 305, 307; 707/705, 708, 726, 758, 707/770–771; 709/201, 203; 711/100, 200, 711/205–208, 221; 715/200, 212, 215, 715/227–228, 273, 275, 700, 764–765, 769, 715/866

See application file for complete search history.

(56) References Cited

U.S. PATENT DOCUMENTS

| | | | | |
|---|---|---|---|---|
| 2004/0181543 | A1* | 9/2004 | Wu et al. | 707/102 |
| 2006/0069702 | A1* | 3/2006 | Moeller et al. | 707/200 |
| 2006/0095439 | A1* | 5/2006 | Buchmann et al. | 707/100 |
| 2007/0171716 | A1* | 7/2007 | Wright et al. | 365/185.12 |
| 2009/0254601 | A1* | 10/2009 | Moeller et al. | 709/201 |
| 2010/0121890 | A1* | 5/2010 | Perkins et al. | 707/805 |
| 2011/0258639 | A1* | 10/2011 | Walsky et al. | 719/316 |

* cited by examiner

*Primary Examiner* — Wesner Sajous
(74) *Attorney, Agent, or Firm* — Young Basile Hanlon & MacFarlane P.C.

(57) ABSTRACT

Systems, servers, methods, media, and programs for storing a list of options associated with object-types, such as a chart-type, selected during an on-line session. When a new object-type is selected, some of the options in the first object-type are copied from the options list associated with the first object-type to the options list associated with the second (new) object-type. The list of options to be transferred is determined by a set rules associated with a transferable array and a set of rules associated with a quarantine set. The transferrable array includes rules for options available for transfer, and quarantine list includes rules for options and type pairs that are not available for transfer.

30 Claims, 6 Drawing Sheets

SELECTION OF OBJECT TYPES WITH DATA TRANSFERABILITY

BACKGROUND

1. Field of the Disclosure

The present disclosure generally relates to selection of object types with data transferability.

2. Background Information

In internet-based or cloud-based computing, documents and applications may be managed or executed using web browsers. In such an environment, information for the documents or applications to be managed or executed is typically obtained from a remote server system or service. Such documents and applications may include, for example, search engines, map services and spreadsheet programs which operate by loading executable HTML and JavaScript code from the server system to a browser running on a client device remote from the server system. The interne or cloud-based computing environment also allows clients the ability to access documents from different computers and locations.

As mentioned, one particular type of document is an electronic spreadsheet application. Spreadsheet applications allow users to input structured data or data models into a spreadsheet that arranges the data in rows and columns defining the spreadsheet cell. Spreadsheets (or worksheets) can enable a user to establish formulas and other relationships between and among the cells that make up the spreadsheet so as to compute a variety of values. The content or data of a spreadsheet can be viewed on a screen or any medium capable of displaying or otherwise indicating the contents contained therein. One such method of displaying the contents or data of the spreadsheet is by using graphical representations or visualizations, for example line graphs, maps, pie charts, tree structures, organizational charts, bar graphs, trends or any other known type of graphical representation or visualization.

Conventionally, when a user elects to change the graphical visualization from one type to another type, a new graphical visualization (representing the newly selected type, for example, a pie chart) is rendered to replace the original graphical visualization (representing the old type, for example, line chart). Similarly, if the user wishes to add or change the content or data that is used to render the graphical visualization, a new graphical visualization is created to replace the original one. In addition to the content or data of the graphical visualization, option(s) are also associated with the selected type of graphical visualization. However, each type of graphical visualization (e.g. pie chart-type, bar line chart-type, etc.) has different options (e.g. color option, title option, etc.) associated therewith. Thus, when a user elects to change the type of graphical visualization, option(s) associated with the first type of chart do not always map to corresponding options in the second type of chart.

SUMMARY OF THE DISCLOSURE

The present disclosure, through one or more of its various aspects, embodiments, and/or specific features or sub-components, provides various systems, servers, methods, media, and programs for generating a graphical comparison of data files.

According to the present disclosure, a system, server, method, media, and program for storing a list of options associated with object-types, such as a chart-type, selected during an on-line session is provided. When a new object-type is selected, some of the options in the first object-type are copied from the options list associated with the first object-type to the options list associated with the second object-type. The list of options to be transferred is determined by a set of rules associated with a transferable array and a set of rules associated with a quarantine set. The transferrable array includes rules for options available for transfer, and quarantine list includes rules for options and type pairs that are not available for transfer.

In one embodiment, there is a non-transitory computer readable medium storing a computer program to configure objects in a distributed system, the program executable by a processor, including associating a data set with a first object for graphical visualization; storing a first list of options corresponding to the first object; replacing the first object with a second object for graphical visualization; copying at least one of the options from the first list of options corresponding to the first object to a second list of options corresponding to the second object; and generating a graphical visualization of the data set based on the second object corresponding to the second list of options.

In another embodiment, there is a computer-implemented server to configure objects in a distributed system, the server including a memory storing: a data set associated with first object for graphical visualization, and a first list of options corresponding to the first object; and including a processor executing the following: replacing the first object with a second object for graphical visualization; copying at least one of the options from the first list of options corresponding to the first object to a second list of options corresponding to the second object, and generating a graphical visualization of the data set based on the second object corresponding to the second list of options.

In still another embodiment, there is a computer-implemented method to configure objects in a distributed system, the distributed system including at least a memory and a processor, including associating a data set with a first object for graphical visualization; storing a first list of options corresponding to the first object; replacing the first object with a second object for graphical visualization; copying at least one of the options from the first list of options corresponding to the first object to a second list of options corresponding to the second object; and generating a graphical visualization of the data set based on the second object corresponding to the second list of options.

In one aspect, the copying further includes copying the at least one of the options from the first list of options to the second list of options based on a first set of rules; copying the at least one of the options from the first list of options to the second list of options based on a second set of rules, wherein the first set of rules define a list of options available for transfer, and the second set of rules define a list of options and object pairs not available for transfer.

In another aspect, the program further includes: retrieving the second list of options from memory when the second object has been previously selected; and updating the second list of options to include the at least one of the options copied from the first list of options.

In still another aspect, the second list includes a predefined list of options and the at least one of the options copied from the first list of options.

In yet another aspect, the program further includes selecting the second object to replace the first object, wherein the generated graphical visualization is automatically generated on a display.

In another aspect, the program further includes selectively switching between the first object and the second object while retaining in a memory the corresponding list of first and second options, respectively.

In still another aspect, the first list of options and second list of options are stored in at least one of a local memory and distributed memory accessible by the distributed system.

In yet another aspect, the stored first list of options and second list of options are stored for a single user session.

In another aspect, the first and second objects are defined as at least one of an: email, document, spreadsheet, graphical visualization, chart, graph, gauge, vehicle, clothing, robot and recipe.

In a further aspect, the first and second objects include at least one of the following types: bar graph, line graph, map, pie chart, tree structure, organizational chart, trend, motion chart, geographical chart, sparkline, gauge.

In still another aspect, the first and second list of options include at least one of: title, color, data, data style, axes, axes style, markers, fills, margins, grid, data sets, data format, legend, max, min, series and data style.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
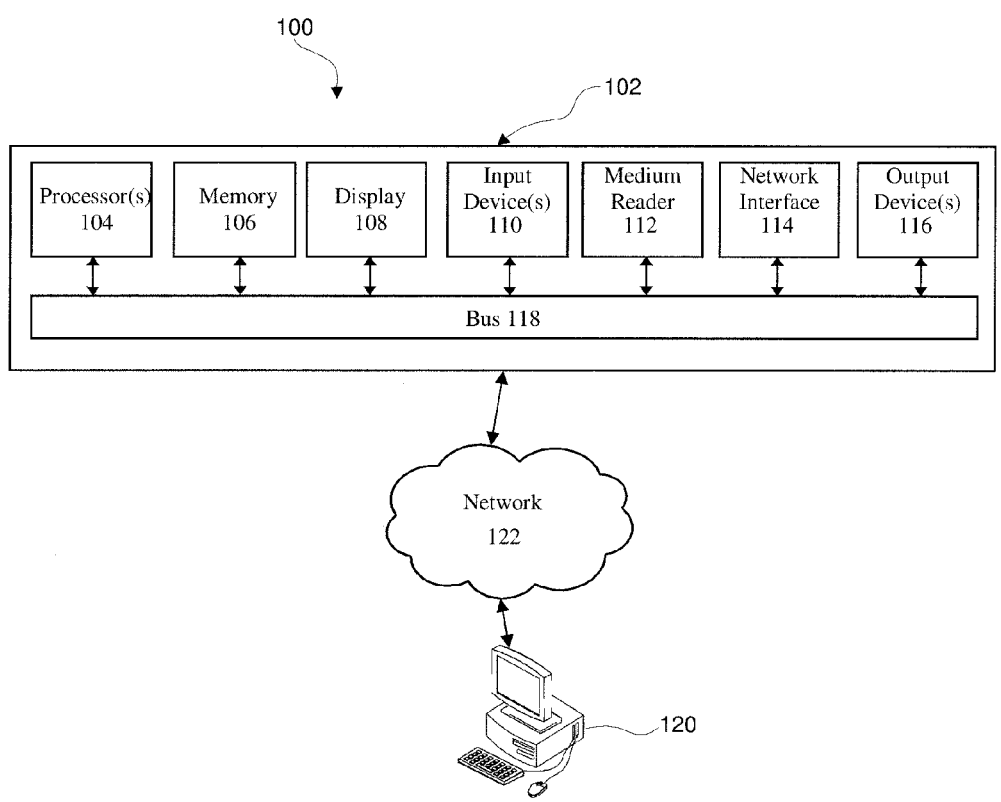
FIG. 1 is an illustrative embodiment of a system for selecting object types using an interface.

FIG. 1 is an illustrative embodiment of a system for selecting object types using an interface. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, or communication networks.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 1, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 1, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 102 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 1 as a wireless network. However, those skilled in the art appreciate that the network 122 may also be a wired network.

The additional computer device 120 is shown in FIG. 1 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 2A:
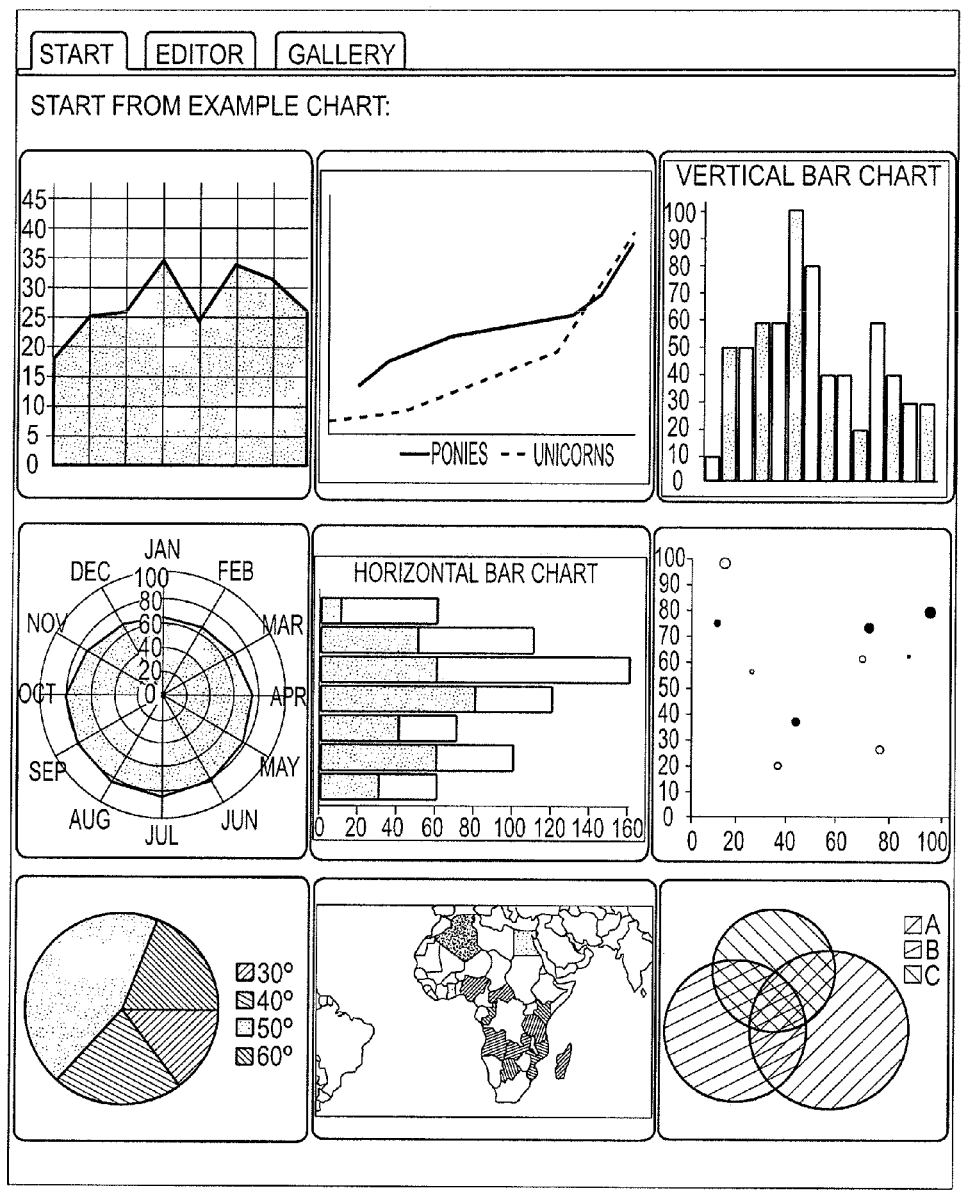
FIG. 2A is an illustrative embodiment of an interface for selection type of graphical visualization using an interface.
Figure 2B:
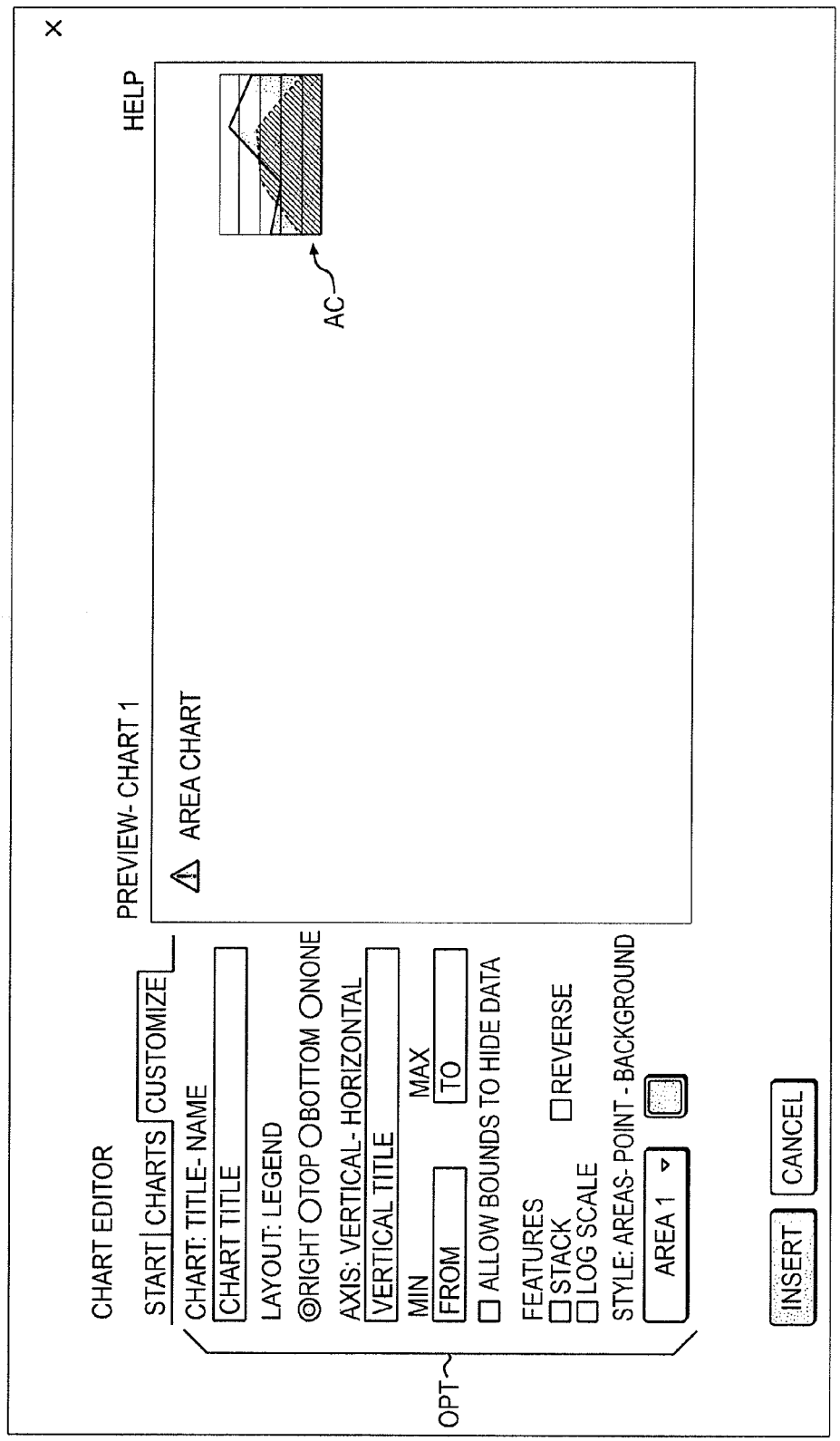
FIG. 2B is an illustrative embodiment of an interface for selection of options in accordance with FIG. 2A.

FIG. 2A is an illustrative embodiment of an interface for selection object types. The user interface UI illustrated in the exemplary embodiment of FIGS. 2A and 2B provides users with the ability to configure (customize) properties of an object, such as an embeddable component with a rendered visual and data model. An object may be defined broadly as any thing, person or matter, such as a robot, vehicle, recipes or articles of clothing. These graphical visualizations or renderings may be dynamic and/or static representations of the content of the "object" that is generated by the application, and may come in the form of any graphical representations, including, but not limited to line graphs, maps, pie charts, tree structures, organizational charts, bar graphs, trends, motions charts, geographical charts, sparklines, gauges, or any other known type of graphical representation or visualization. Additionally, objects that extend to applications beyond charts (for example, the aforementioned clothing) may apply a shopping tool that helps users buy objects and understand options/preferences according to the object type. For example, if a user purchases a shirt or a jacket, the application knows the selected size M, that the user prefers cotton, and that shoes and sock size are 10).

Using the user interface, a user may select a type of object, as well as configure data associated with the object. Moreover, the user interface UI allows a user to select a new type of object, while transferring at least some of the data associated therewith. In one exemplary embodiment, the user interface UI enables a user to select a type of graphical visualization, for example a type of chart G1-GN. This chart will be illustrated in the user interface UI (see FIG. 2B, item AC) such that a user may redesign the chart, change chart types, or even change the content (source) data. As explained, each type of chart may be associated with configurable data, herein termed "options." For example, options for a specified chart-type may include title, color, data, data style, axes, axes style, markers, fills, margins, grid, etc. Each type of chart G1-GN may have different options or a set of options that is specifically tailored to that chart type. For example, a user may select a pie chart G7, which has options of title, color and 3D. Alternatively, the user may select an area chart, which has options of only title.

FIG. 2B is an illustrative embodiment of an interface for selection of options in accordance with FIG. 2A. As illustrated, the user interface UI allows a user to configure the options of a selected object-type. In the illustrated embodiment, the user interface UI includes a list of options OPT and a diagram AC that illustrates the selected chart-type (in this example, area chart) with content data and customized options applied thereto. In this example, the list of options OPT include Title (including name), Layout (including right, top, bottom and none), Axis (including minimum and maximum), Features (including stack, log scale and revers) and Style (including area, point and background). Additional options may include data sets, data style, axes, axes style, markers, fills, margins and grid, each of which enable a user to customize respective options. Any number of options may be associated with a particular object-type, and the described embodiment is not intended to limit the scope of the disclosure to those described. It is appreciated that a user does not determine which options are viable for a specified object-type, but rather may configure each of the available options. That is, the options are predetermined based on the selected object-type (e.g. chart-type). Thus, if "title" is a predetermined option, a user may not delete the "title" option (or change it), but may change the name of the title (i.e. change the text that comprises the title from one name to another).

As explained briefly above, although a user may not change the "options" for a type of object, the user may change the object-type during a session. For example, a user may initially select a Line Chart-type graphical visualization, and then determine that an Area-type graphical visualization is more appropriate. However, when changing from a first object-type to a second object-type (or vice versa), the options from the first object-type to the second object-type (or vice versa) do not always match. Hence, options associated in the first object-type that have been customized by the user may not map or transfer properly to options associated with the second object-type. Mapping or transferring of options may be difficult since some options have different semantics or meanings depending on the chart-type. For example, an option has the same name for different charts (e.g. a line chart versus a spark line chart), but has different JavaScript types (e.g. min/max for a line chart, and an array for a spark line chart). For example, a pie type-chart may include options of title, colors and Is3D, whereas an area-type chart may include the option of title. Accordingly, if a user changes the chart-type from a pie chart to an area chart, there is no "option" to retain the colors and Is3D customized data. See, for example, the table below, which illustrates an exemplary map of options from a pie chart to an area chart. In another exemplary embodiment, a non-scatter-type chart includes the option of point size (for example, point size=0). However, a scatter-type chart does not illustrate lines, and therefore mapping or transferring point size from a non-scatter to a scatter-type chart is irrelevant.

| TYPE | PIE CHART | | |
|---|---|---|---|
| OPTIONS | Title | Colors | Is3D |
| TYPE | AREA CHART | | |
| OPTIONS | Title | | |

Figure 3:
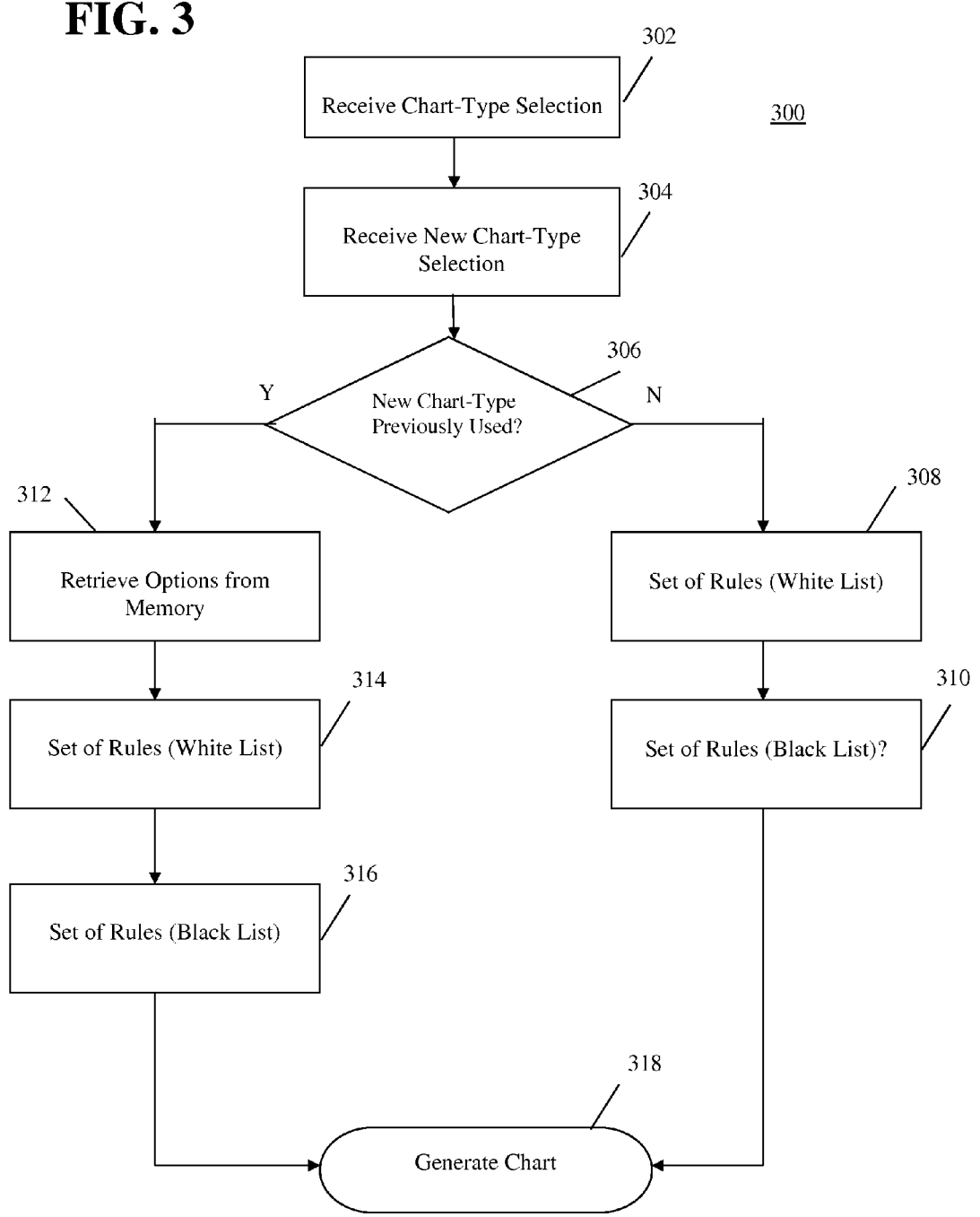
FIG. 3 is an exemplary flow diagram of selecting a type of graphical visualization using an interface.

FIG. 3 is an exemplary flow diagram of selecting a type of graphical visualization using an interface. The flow diagram may be generally described as follows. A list of options is stored for each chart-type selected during a session. The list may be stored, for example, in memory 106 of computer system 102, on client device 120 or in any storage location or memory that is accessible by the system 100. (It is appreciated that the term session as used in this context is not limited to a single session, but may include multiple sessions. Moreover, the session is not limited to a single user, but may include multiple users and or client devices). For example, if a user selects a Line-type Chart and then changes to an ImageSparkLine-type chart, the two options lists are stored, one for Line-type chart and one for ImageSparkLine-type chart. When a new object-type (e.g. chart-type) is selected, some of the options are copied from the options list associated with the first object-type (e.g. Line-type) to the options list associated with the second (new) object-type (ImageSparkLine-type). The list of options to be transferred is determined by a set of rules, herein a transferable (or "white" listed) array and a quarantine (or "black" listed) set. The white list includes names of options available for transfer. The black list, on the other hand, includes a list of options and type pairs that are quarantined or not available for transfer. The attached drawing illustrates the flow of operation 300.

In operation, computer 102 receives a chart-type selection from a client device, such as client device 120, at 302. The chart-type is associated with data content, for example from a spreadsheet, to be represented as a graphical visualization. That is, a graphical visualization will be generated using the data content of the spreadsheet, which graphical visualization will appear in the form of the selected chart-type. It is appreciated that the selection is not limited to a chart-type, but may be any type associated with any object. Similarly, the data content is not limited to data content of a spreadsheet, but may be data content associated with any object. As explained, the selected chart-type has an associated data set, such as an option or option set. The options (customized or default values) of a selected chart-type are stored (at least temporarily), for example, in memory 106 of computer system 102, on client device 120 or in any storage location or memory that is accessible by the system 100.

At 304, computer 302 receives a new chart-type selection from the client device 120. The newly selected chart-type may be a chart-type previously selected, or a completely new selection. Computer 102 first determines whether the newly selected chart-type has been previously used at 306. If the newly selected chart-type is determined to have been previously used, then the process continues to 312. If the newly selected chart-type is determined not to have been previously used, then the process continues to 308 and 310 (processes 308 and 310 are identical to processes 314 and 316, described herein below and will therefore not be discussed separately). At 312, the list or set of options stored in memory from the prior use are is retrieved. The list or set of options from the current or original chart-type selection are then transferred to the list or set of options in the newly selected chart-type, to the extent provided by the white and black lists, as further explained. A list of options that are copied or transferrable (an array of transferrable options or "white" listed) when a chart-type is changed (e.g. a new chart-type selection is made) include, but are not limited to, the following: backgroundColor, colors, hasLabel column, legend, logScale, max, min, series, title, titleX and titleY. A list of type/option pairs that are not copied or transferred (a quarantined options or "black" listed) when a chart-type is changed (e.g. a new chart-type selection is made) include, but are not limited to, the following: (CandlestickChart, legend) and (ComboChart, is Stacked). It is appreciated that the disclosed white and black lists are not intended to limit the scope of the embodiment. Rather, the disclosed white and black lists are exemplary embodiments. Options included in either of the lists may be chosen and/or modified accordingly.

At 314, the list or set of options of the first chart-type selection (first received chart-type) are mapped to the second chart-type selection (the newly selected chart-type, which may have been previously selected). The list or set of options associated with the first chart-type is transferred/copied into the list or set of options of the second chart-type according to the white list rules. For example, if the white list rules allow for a title option to be transferred, then the title option of the first chart-type is transferred/copied to the title option of the second chart-type. If a specific option in the chart is not listed in the white list, the option is not transferred/copied. At 316, the list or set of options of the first chart-type selection is quarantined/blocked from transfer/copy to the second chart-type selection. That is, the list or set of options associated with the first chart-type selection is not transferred/copied into the list or set of options of the second chart-type according to the black list rules. For example, if the black list rules do not allow for the type/option pair of pie chart/colors to be transferred/copied, then the color option of the pie-type chart of the first chart-type selection is prohibited (quarantined) from being transferred/copied to the second chart-type selection. This is true even if the option has already appeared in the white list. That is, the black list rules take priority over the white list rules. Thus, if the option is not black listed (and appears on the white list), the option is transferred/copied. A new chart-type may then be generated at 318 according to the content data and options (including transferred/copied options). The computer 102 maintains the list or set of options for the first chart-type, as well as the second chart-type, for later use.

Figure 4A:
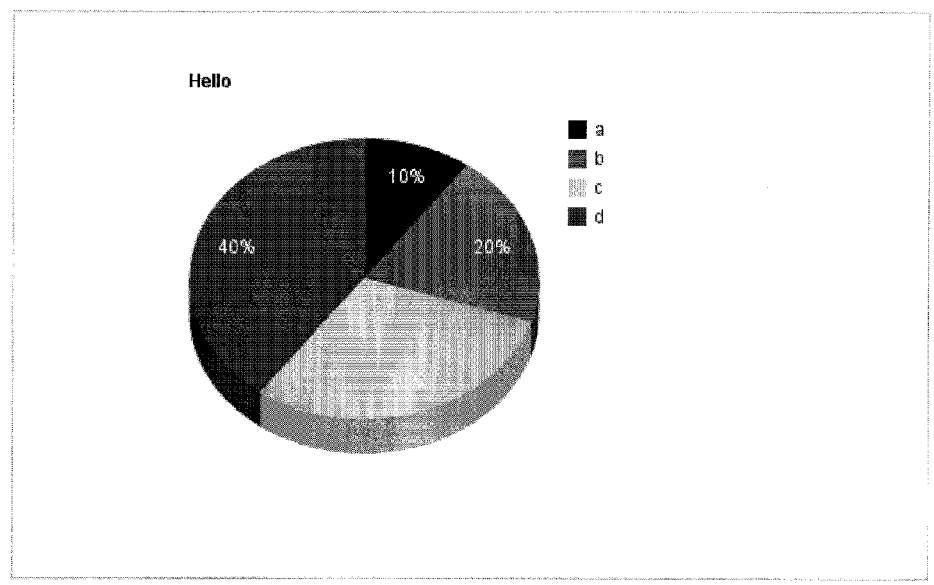
FIG. 4A is an illustrative embodiment of a first type of graphical visualization.
Figure 4B:
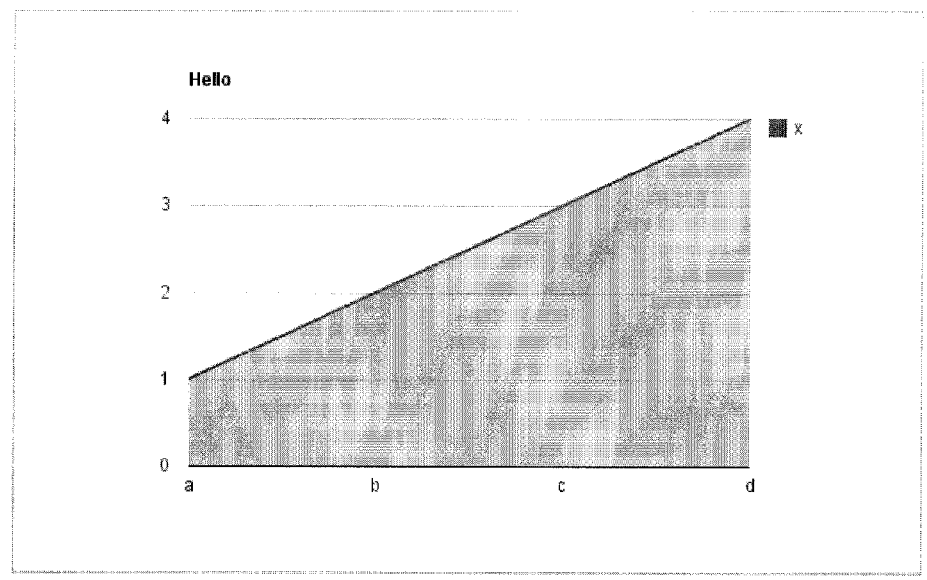
FIG. 4B is an illustrative embodiment of a second type of graphical visualization.

With reference to FIGS. 4A and 4B, an example of the flow diagram is described below. This example is not intended to limit the scope of the disclosure and merely represents an exemplary embodiment for purposes of discussion. FIG. 4A is an illustrative embodiment of a first type of graphical visualization. As illustrated, the first type of graphical visualization is a pie chart. Content data associated with the pie chart includes, for example, variables a, b, c and d. As previously explained, the content data is previously input into or extracted by a program, such as an online-document (e.g. a spreadsheet), by client device 120. In this example, the pie chart is the type, and includes the following option(s): title, colors and Is3D. Specifically, the title="Hello", the colors="black, grey, white, pink" (in the illustrated embodiment, only gray scale colors are shown) and Is3D="true."

FIG. 4B is an illustrative embodiment of a second type of graphical visualization. This example is not intended to limit the scope of the disclosure and merely represents an exemplary embodiment for purposes of discussion. FIG. 4B is an illustrative embodiment of a second type of graphical visualization. As illustrated, the second type of graphical visualization is an area chart. Content data associated with the area chart also includes, for example, variables a, b, c and d. As previously explained, the content data is previously input into or extracted by a program, such as an online-document (e.g. a spreadsheet), by client device 120. In this example, the area chart is the type, and includes the following option(s): title. Specifically, the title="Hello."

During operation of system 100, client device 120 selects a first type of graphical visualization (as explained with reference to FIG. 3). In this example, the client device 120 selects a pie chart as the first type of graphical visualization, as illustrated in FIG. 4A. The selection is received by computer system 102 for processing. Here, client device 120 (or a user operating client device 120) sets the options for the selected chart-type. Specifically, the title is set to "Hello", the colors are set to "black, grey, white, pink" and is 3D is set to "true." When the client device 120 selects a new chart-type (or selects a previously used chart-type), the selection is received at computer system 102. In this case, the newly selected chart-type is an area chart. Since the newly selected area chart has not previously been selected, there is no need to retrieve previously stored options from memory. Accordingly, as explained above with reference to FIG. 3, the computer system 102 accesses the rules associated with the white list to determine which options should be transferred from the list or set of options from the first chart-type (pie chart in this example) to the list or set of options of the second chart-type (area chart in this example). In this example, the option "Is3D" does not appear in the white list. Therefore, the "Is3D" option is not transferrable from the pie chart to the area chart, and it is removed from the list to be transferred. All other options are transferred (options included at this point are: title and colors, Is3D has been removed). Next, the computer system 102 accesses the rules associated with the black list to determine which additional options, if any, should be removed from the list of transferrable options. In this example, the pair (pie chart, colors) appears on the black list, resulting in quarantine or removal of the colors option (options included at this point are: title, with Is3D having been previously removed, and colors being quarantined or removed at this time). Upon completion of accessing the black list, the second type of graphical visualization (i.e. the newly selected area chart) is rendered as a graphical visualization, as illustrated in FIG. 4B. As illustrated, the only option that transferred from the pie chart list or set of options to the area chart list or set of options is the title ("Hello"). It is appreciated that the described embodiment is exemplary in nature and not intended to limit the scope of the disclosure.

Accordingly, the present invention provides various systems, servers, methods, media, and programs for generating a graphical comparison of data files. Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer readable medium storing a computer program to configure objects in a distributed system, the program executable by a processor, comprising:
    associating a data set with a first object for graphical visualization;
    storing a first list of options corresponding to the first object;
    replacing the first object with a second object for graphical visualization;
    copying at least one of the options from the first list of options corresponding to the first object to a second list of options corresponding to the second object wherein the copying further comprises:
        copying the at least one of the options from the first list of options to the second list of options based on a first set of rules;
        copying the at least one of the options from the first list of options to the second list of options based on a second set of rules, wherein
        the first set of rules define a list of options available for transfer, and
        the second set of rules defines a list of options and object pairs not available for transfer; and
    generating a graphical visualization of the data set based on the second object corresponding to the second list of options.

2. The computer readable medium of claim 1, further comprising:
    retrieving the second list of options from memory when the second object has been previously selected; and
    updating the second list of options to include the at least one of the options copied from the first list of options.

3. The computer readable medium of claim 1, wherein the second list includes a predefined list of options and the at least one of the options copied from the first list of options.

4. The computer readable medium of claim 1, further comprising:
    selecting the second object to replace the first object, wherein the generated graphical visualization is automatically generated on a display.

5. The computer readable medium of claim 1, further comprising:
    selectively switching between the first object and the second object while retaining in a memory the corresponding list of first and second options, respectively.

6. The computer readable medium of claim 1, wherein the first list of options and second list of options are stored in at least one of a local memory and distributed memory accessible by the distributed system.

7. The computer readable medium of claim 1, wherein the stored first list of options and second list of options are stored for a single user session.

8. The computer readable medium of claim 1, wherein the first and second objects are defined as at least one of an: email, document, spreadsheet, graphical visualization, chart, graph, gauge, vehicle, clothing, robot and recipe.

9. The computer readable medium of claim 1, wherein the first and second objects include at least one of the following types: bar graph, line graph, map, pie chart, tree structure, organizational chart, trend, motion chart, geographical chart, sparkline, gauge.

10. The computer readable medium of claim 1, wherein the first and second list of options include at least one of: title, color, data, data style, axes, axes style, markers, fills, margins, grid, data sets, data format, legend, max, min, series and data style.

11. A computer-implemented server to configure objects in a distributed system, the server comprising:
    a memory storing:
        a data set associated with first object for graphical visualization, and
        a first list of options corresponding to the first object; and
    a processor executing the following:
        replacing the first object with a second object for graphical visualization;
        copying at least one of the options from the first list of options corresponding to the first object to a second list of options corresponding to the second object,
        generating a graphical visualization of the data set based on the second object corresponding to the second list of options,
        retrieving the second list of options from memory when the second object has been previously selected, and
        updating the second list of options to include the at least one of the options copied from the first list of options.

12. The computer implemented server of claim 11, wherein the memory further storing:
    a first set of rules defining a list of options available for transfer, and
    a second set of rules defining a list of options and object pairs not available for transfer; and
    the processor further executing:
        copying the at least one of the options from the first list of options to the second list of options based on the first set of rules, and
        copying the at least one of the options from the first list of options to the second list of options based on the second set of rules.

13. The computer implemented server of claim 11, wherein the second list includes a predefined list of options and the at least one of the options copied from the first list of options.

14. The computer implemented server of claim 11, further comprising:
    selecting the second object to replace the first object, wherein the generated graphical visualization is automatically generated on a display.

15. The computer implemented server of claim 11, further comprising:
    selectively switching between the first object and the second object while retaining in the memory the corresponding list of first and second options, respectively.

16. The computer implemented server of claim 11, wherein the first list of options and second list of options are stored in at least one of a local memory and a distributed memory accessible by the distributed system.

17. The computer implemented server of claim 11, wherein the stored first list of options and second list of options are stored for a single user session.

18. The computer implemented server of claim 11, wherein the first and second objects are defined as at least one of an: email, document, spreadsheet, graphical visualization, chart, graph, gauge, vehicle, clothing, robot and recipe.

19. The computer implemented server of claim 11, wherein the first and second objects include at least one of the following types: bar graph, line graph, map, pie chart, tree structure, organizational chart, trend, motion chart, geographical chart, sparkline, gauge.

20. The computer implemented server of claim 11, wherein the first and second list of options include at least one of: title, color, data, data style, axes, axes style, markers, fills, margins, grid, data sets, data format, legend, max, min, series and data style.

21. A computer-implemented method to configure objects in a distributed system, the distributed system including at least a memory and a processor, comprising:

associating a data set with a first object for graphical visualization;

storing a first list of options corresponding to the first object;

replacing the first object with a second object for graphical visualization;

copying at least one of the options from the first list of options corresponding to the first object to a second list of options corresponding to the second object;

generating a graphical visualization of the data set based on the second object corresponding to the second list of options; and selectively switching between the first object and the second object while retaining in the memory the corresponding list of first and second options, respectively.

22. The computer-implemented method of claim 21, wherein the copying further comprises:

copying the at least one of the options from the first list of options to the second list of options based on a first set of rules;

copying the at least one of the options from the first list of options to the second list of options based on a second set of rules, wherein the first set of rules define a list of options available for transfer, and the second set of rules define a list of options and object pairs not available for transfer.

23. The computer-implemented method of claim 22, further comprising:

retrieving the second list of options from memory when the second object has been previously selected; and updating the second list of options to include the at least one of the options copied from the first list of options.

24. The computer-implemented method of claim 22, wherein the second list includes a predefined list of options and the at least one of the options copied from the first list of options.

25. The computer-implemented method of claim 22, further comprising:

selecting the second object to replace the first object, wherein the generated graphical visualization is automatically generated on a display.

26. The computer-implemented method of claim 22, wherein the first list of options and second list of options are stored in at least one of a local memory and distributed memory accessible by the distributed system.

27. The computer-implemented method of claim 22, wherein the stored first list of options and second list of options are stored for a single user session.

28. The computer-implemented method of claim 22, wherein the first and second objects are defined as at least one of an: email, document, spreadsheet, graphical visualization, chart, graph, gauge, vehicle, clothing, robot and recipe.

29. The computer-implemented method of claim 22, wherein the first and second objects include at least one of the following types: bar graph, line graph, map, pie chart, tree structure, organizational chart, trends, motion chart, geographical chart, sparkline, gauge.

30. The computer-implemented method of claim 22, wherein the first and second list of options include at least one of: title, color, data, data style, axes, axes style, markers, fills, margins, grid, data sets, data format, legend, max, min, series and data style.

* * * * *